United States Patent [19]
Larson

[11] 3,789,671
[45] Feb. 5, 1974

[54] PARTICULATE MATERIAL SAMPLING DEVICE

[76] Inventor: Henry B. Larson, R.R. 1, Bement, Ill. 61813

[22] Filed: Oct. 29, 1971

[21] Appl. No.: 193,925

[52] U.S. Cl. .............................. 73/423 R, 73/425.6
[51] Int. Cl. ............................................. G01n 1/14
[58] Field of Search...... 73/423 R, 421.5 R, 421 R, 73/425.2, 422 R; 175/213; 166/107

[56] References Cited
UNITED STATES PATENTS

| 3,198,265 | 8/1965 | Voelkerding | 73/421.5 X |
| 3,228,249 | 1/1966 | O'Brien | 73/421 B |
| 3,524,352 | 8/1970 | Paul | 73/423 R |
| 1,994,884 | 3/1935 | Chew | 73/425.2 X |
| 3,365,952 | 1/1968 | Wang | 73/425.2 |
| 2,726,548 | 12/1955 | Van Der List | 73/422 R |
| 3,683,677 | 8/1972 | Harris | 73/45.1 |

Primary Examiner—Richard C. Queisser
Assistant Examiner—Daniel M. Yasich
Attorney, Agent, or Firm—John F. Dunn

[57] ABSTRACT

This invention is a device for removing a sample of particulate material from predetermined locations in the mass of said material.

1 Claim, 2 Drawing Figures

Patented Feb. 5, 1974

3,789,671

PARTICULATE MATERIAL SAMPLING DEVICE

This invention relates to a device for sampling particulate material. More particularly this invention relates to a device of simple and inexpensive design which is advantageous for isolating and removing a sample of particulate material from the mass of said material. Further this invention relates to a device for sampling grain in trucks or other containers.

Obviously where a large mass or bulk of particulate material such as grain, oil seeds, meals and other finely divided material are transported to market by truck, railroad car or other means and offered for sale it is not possible to inspect the entire mass or bulk of material. Accordingly samples are typically removed for physical inspection and subjection to tests and analyses in order to determine the quality of the product being offered for sale as well as the extent, if any, to which it is subject to spoilage in storage. It will thus be apparent that accurate, representative sampling is the only valid basis for determining true market value of grain and other finely divided materials offered for sale and where the sampling methods are not accurate and not representative the market value of grain and other particulate materials may not reflect their true value.

In many, if not most, prior art applications sampling of particulate materials is done manually. Typically an operator positions a ladder alongside the truck, railroad car or other container to be sampled with a hand operated probe to be manually forced into the mass of material to be sampled. This procedure, while it does permit accurate representative samples to be taken, is disadvantageous. This method is slow and tedious and requires considerable physical strength on the part of the worker involved. Also the strength of the worker is the limit of the depth into which a manually operated probe can penetrate. If the operator cannot force the probe all the way to the bottom of the mass of material, the sample is not representative, and may not accurately reflect the qualities of the entire mass or bulk of material. Accordingly, such a sample is not a dependable basis for making a qualitative determination of condition of the mass of material.

Power has been used for sampling particulate materials such as the type referred to herein; however, prior art devices, in comparison to the present invention, are slow to use, intricate of design, expensive to manufacture and susceptible to frequent breakdown.

The present invention is advantageous with respect to prior art devices, both manual and powered, because of its simplicity of design which permits a single operator to rapidly and efficiently take samples of grain or other particulate material from desired locations within the mass or bulk of said material. Applicant's device is further advantageous by reason of the fact that it is not expensive to operate and it is capable of providing a core sample representative of the bulk of material throughout the entire depth thereof.

As has been previously pointed out the ability to sample grain and other particulate material is very important. For example if grain is in good condition it may be stored for long periods of time without damage. On the contrary where grain is subject to spoilage, which spoilage is not discovered promptly, serious losses may take place before discovery thereof and spoiled grain may contaminate other grain with which it is comingled. Therefore it becomes apparent that it is advantageous, in order to proceed in the most efficient and economic manner to take samples of grain or other particulate material in storage from a variety of depths of the storage container on a regular basis.

Therefore an object of this invention is a device for the sampling of particulate material. Another object of this invention is a device for sampling particulate material with suction means. A further object of this invention is a device to enable a single worker to advantageously sample particulate material by withdrawing samples of said material from predetermined locations within the mass thereof by suction means.

Other objects of the invention will be apparent from the detailed description thereof which follows.

Figures 1, 2:
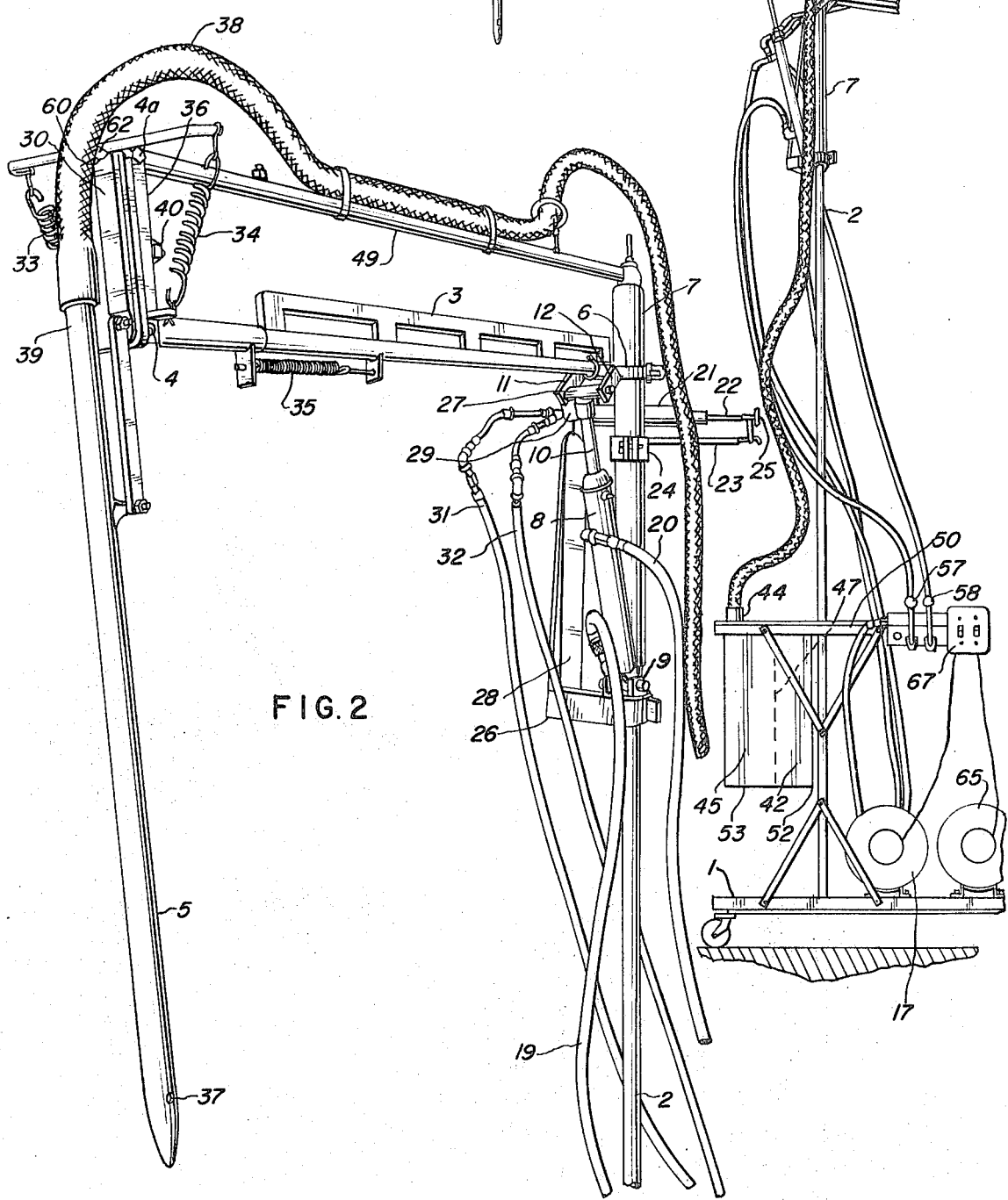
FIG. 1 shows, an embodiment of the invention for separating a sample of particulate material from the bulk or mass thereof.
FIG. 2 illustrates in detail the upper portion of the embodiment depicted in FIG. 1.

Broadly the present invention is a device for sampling particulate material which device includes a probe having an interior space and suction means to draw a sample of particulate material from the mass of said probe into said interior space. Thereby when said sample is drawn from the bulk of said material into said interior space the sample is isolated from the mass of particulate material.

In a preferred embodiment of the invention a probe having an interior space and two openings therein is employed. Each opening forms a passageway from the interior space to the exterior of said probe. Means are employed to position said probe in predetermined locations with respect to the mass of particulate material to be sampled. Suction means is employed to draw a sample of particulate material through an opening near the tip of the probe into the interior space and therethrough by means of the other opening in the probe into a sample container whereby the sample is isolated from the mass of material.

Thus it will be seen that the present invention is advantageous with respect to prior art devices. It is simple of design and relatively inexpensive to manufacture. Applicant's device is durable and can be controlled and operated by a single worker. It is relatively maintenance free. The device of the present invention premits rapid sampling of particulate material in contrast to the disadvantageous, cumbersome slow-moving devices known in the prior art.

Referring now to the drawings for purpose of illustration the embodiment of FIG. 1 shows dolly 1 upon which is mounted support pole 2. Support pole 2 is substantially vertical in position. Sleeve 7 is rotatably fitted about pole 2. Support arm 3 is pivotally attached to sleeve 7 by means of hinge 6 and probe 5 is pivotally connected to support arm 3 at hinge 4.

In the embodiment illustrated support pole 2 is shown attached to moveable dolly 1. In this embodiment the entire device may be moved about and positioned adjacent to the bed of a truck filled with grain so that support arm 3 may be rotated about support pole 2 into position over the bed of said material from which position probe 5 may be lowered into said material. Support pole 2 may suitably be rigidly connected to a permanent support in many applications. For example it may be convenient to position said support pole 2 in a permanent position adjacent weighing devices commonly found at grain elevators.

As depicted in detail in FIG. 2 support arm 3 is pivotally connected to sleeve 7 by means of hinge 6. Hydraulic piston 8 is pivotally connected to sleeve 7 at the bottom of the sleeve by hinge 9. Piston rod 10 is pivotally connected at its upper end extending from piston 8 to arm 3 by hinge 11.

The bottom portion of sleeve 7 rides on top of clamp 26 which is rigidly secured to support pole 2. Hydraulic pressure is exerted upon piston 8 by means of pump 17 through hoses 19 and 20. Accordingly as piston rod 10 is raised support arm 3 is raised and as piston 10 is lowered support arm 3 is lowered.

In like fashion piston 21 is rigidly fastened to support pole 2 by clamp 26. Vertical arm 28 is rigidly fastened to clamp 26 and end 29 of piston 21. Piston rod 22 is pivotally connected to sleeve 7 by means of rod 23 and clamp 24, hinges 25 and 27. Piston 21 is connected to pump 17 by means of hoses 31 and 32.

Probe 5 is rigidly connected to plate 30. Plate 36 is pivotally connected to support arm 3 and arm 49 at hinges 4 and 4a. Plates 30 and 36 are pivotally connected by means of fastener 40 which includes a spring on said fastener between plates 30 and 36 to permit movement of probe 5 throughout a slight angle as it enters a bed of particulate material. This is advantageous when the probe is lowered into a bed of grain in a container the sides of which have a sloping configuration as for example, the sloping sides of the beds commonly found in trucks used to haul grain. As probe 5 strikes the sloping side of a truck bed in its downward path into a mass of particulate material the force exerted against probe 5 can overcome springs 33, 34 and 35 and probe 5 is thereby enabled to penetrate to the bottom of the sloping bed without damage to the probe.

The top of plate 30 is a cam with concave indentation 60. Plate 36 has anchor pin 62 slidably springs maintained at the top thereof. In normal operation pin 62 is maintained in indentation 60 to probe 5 in a normally substantially vertical position. In the event, however, that the bed of particulate material, for example a truck loaded with grain, is unintentionally driven out from under probe 5 before its raised up out of the bed the force exerted on probe 5 will eventually increase to a level sufficient to override the spring maintained a pin 62 in indentation 60. Thereby pin 62 will be raised up out of the indentation and probe 5 will then be freed to pivot out of danger in response to the force exerted upon it. Probe 5 may then later again be centered by returning it to its normal position at which point pin 62 will again drop into indentation 60.

Probe 5 is an elongated hollow probe with an opening 37 near the tip thereof. At the opposite end of said probe, conduit, advantageously comprising rubber tubing, is connected to the opening at the top of said probe 39. Tube 38 is sealed onto probe 5 at top 39 by any conventional means known in the art in order to permit a vacuum to be drawn by suction means through said tube. Tube 38 is supported on arm 49 and tube 38 is connected to sample box 42 at its inlet 44 near the front of said container.

Sample container 42 contains sample chamber 45 at the rear of which is mesh screen 47. At the top rear portion of sample container 42 vacuum line 50 is connected to vacuum pump 65. Sample container 42 may conveniently include part or all of one wall thereof of glass or other transparent material capable of withstanding the pressure differential to which it is subjected, so a worker may readily observe the level of sample in sample chamber 45. The bottom of sample chamber 45 is pivotally connected to container 42 at 52 and said bottom panel 53 may be opened to release the contents of sample chamber 45.

In operation dolly 1 is positioned adjacent to the container of particulate material to be sampled. Support arm 3 is then raised over the bed of material to be sampled by hydraulic piston 8 and rotated about support pole 2 by piston 21 to position probe 5 above and over the bed of material to be sampled in response to actuation of known control means in lines 19–20 and in lines 31–32, such as controls 57 and 58. Probe 5 is then lowered by again activating said controls 57 and 58 to penetrate to the desired depth into the mass of particulate material to be sampled. As controls 57 and 58 are again actuated to raise probe 5 and remove it from the bed of material to be sampled, pump 65 is actuated by pressure switch 67 responding to pressure differential in line 19 and draws a vacuum through conduit 38 and into probe 39 whereby particulate material to be sampled is drawn through opening 37 in said probe through the hollow inner portion of said probe into conduit 38 through which it flows into sample container 42. Sample is continuously taken from the mass of material as probe 5 is withdrawn with the result that when probe 5 is removed from the mass of material and all the material which has entered probe 5 through point 37 has passed into sample container 42 the sample therein is an accurate representative sample of the particulate material at all depths of the mass to be sampled.

It will be apparent that controls 57 and 58 may be actuated in connection with suction means 65 to position probe 5 and opening 37 therein in any selected predetermined location with respect to the mass or bulk of material to be sampled. Thereby a complete sample may be taken from any particular given location in the mass of material by maintaining probe 5 in a constant position until sample chamber 45 of sample container 42 is filled. Likewise suction means 17 may be actuated in order to draw a sample into probe 5 either as the probe is penetrating into the mass of material to be sampled or as it is withdrawn in order to obtain a representative sample of the entire depth or cross section or core of said material.

Thus it will be apparent that the invention is not limited to the structure in the exact methods described above but shall also include other structures and combinations following within the broad scope and spirit of the invention, the detailed description, and the claims which follow.

What is claimed is:

1. A sample probe device comprising an elongated support pole, a support arm having an inner and outer end, said support arm being pivotally connected to said support pole at the inner end thereof, an elongated hollow probe pivotally connected to the outer end of said support arm, said probe having an opening into the interior thereof adjacent each end of said probe, a sample container including a sample chamber and means to trap said sample therein and means to remove sample material from said container, vacuum conduit means connecting the end opening of said probe adjacent said outer end of support arm with said sample container, separate hydraulic means to move said support arm along the longitudinal axis of said support pole and rotate said support arm about said support pole, and suction means actuated by means responding to a pressure differential in the hydraulic means upon actuation by said hydraulic means to move the support arm about said support pole to draw a vacuum through said probe, conduit means, and said sample chamber and to continue to draw a vacuum within said sample container when the sample chamber of said container is filled with sampled material whereby when said probe is in selected predetermined locations with respect to the mass thereof said sample is drawn through said probe into said conduit means and therethrough so as to be trapped into the sample chamber of said sample container.

\* \* \* \* \*